(12) United States Patent
Tulsidas

(10) Patent No.: US 12,139,891 B2
(45) Date of Patent: Nov. 12, 2024

(54) INTELLIGENT WATER NETWORK MANAGEMENT SYSTEM AND A METHOD THEREOF

(71) Applicant: Techolution Consulting LLC, New York, NY (US)

(72) Inventor: Luv Tulsidas, New York, NY (US)

(*) Notice: Subject to any disclaimer, the term of this patent is extended or adjusted under 35 U.S.C. 154(b) by 27 days.

(21) Appl. No.: 18/074,094

(22) Filed: Dec. 2, 2022

(65) Prior Publication Data
US 2024/0183134 A1 Jun. 6, 2024

(51) Int. Cl.
*E03B 7/07* (2006.01)
*E03B 7/04* (2006.01)
*E03B 11/02* (2006.01)
*G01F 15/063* (2022.01)

(52) U.S. Cl.
CPC ............. *E03B 7/078* (2013.01); *E03B 7/04* (2013.01); *E03B 7/072* (2013.01); *E03B 11/02* (2013.01); *G01F 15/063* (2013.01)

(58) Field of Classification Search
CPC . E03B 7/078; E03B 7/04; E03B 7/072; E03B 11/02; G01F 15/063
See application file for complete search history.

(56) References Cited

U.S. PATENT DOCUMENTS

| | | | |
|---|---|---|---|
| 2018/0059691 A1* | 3/2018 | Fleming | G06Q 50/02 |
| 2019/0234786 A1* | 8/2019 | Klicpera | G01M 3/26 |
| 2019/0297397 A1* | 9/2019 | Fleishman | H04L 67/12 |
| 2021/0397145 A1* | 12/2021 | Sandhu | G06F 16/258 |

* cited by examiner

*Primary Examiner* — Amine Benlagsir
(74) *Attorney, Agent, or Firm* — Mestechkin Law Group P.C.

(57) ABSTRACT

The intelligent water network management system and method to intelligently monitor and/or control water parameters and identify and solve real time issues comprising theft, leakages, and quality of water, pressure change and related damages across water networks through an Internet-of-Things (IoT) Gateway connected to a cloud software/platform and components in a water distribution network including but not limited to water meters, water quality sensors, reservoir sensors and actuators connected wired or wirelessly to a local gateway that collects, processes/examines, aggregates, and transfers the real time data or information of sensors/meters at a predefined frequency and pushes it to a cloud platform that receives information from the gateways, analyzes it and identifies the occurrence of real time events (water leakage/theft/water quality issues/water running out) and thereafter alerts the relevant authorities for investigation of water leakage/theft/water quality issues at a specific location, the information displayed on the dashboard for user access.

11 Claims, 1 Drawing Sheet

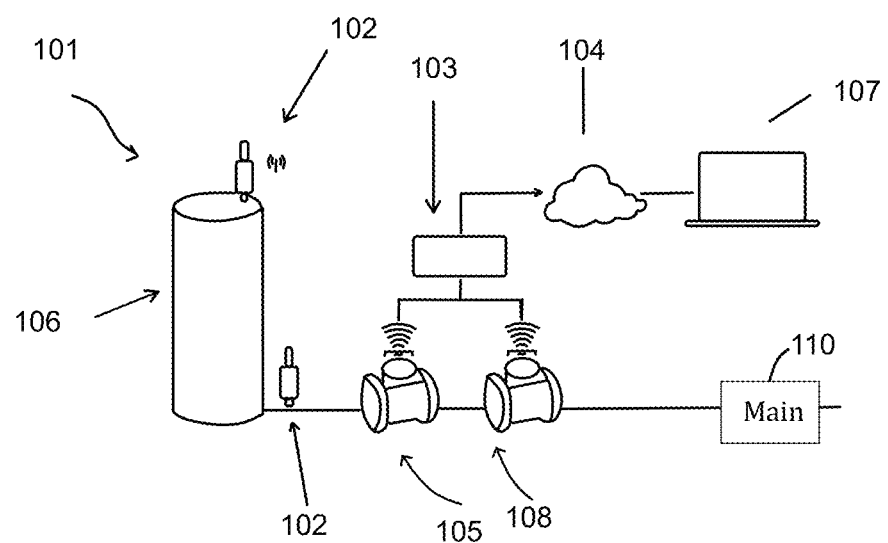

INTELLIGENT WATER NETWORK MANAGEMENT SYSTEM AND A METHOD THEREOF

TECHNICAL FIELD OF THE INVENTION

The present application generally relates to water management systems and methods. Specifically, the application relates to an intelligent water network management system and a method, wherein a local gateway aggregates and transfers the real time data or information of sensors/meters at a predefined frequency to a cloud-based platform, reports the occurrence of a real time event (water leakage/theft) amongst others and further investigates the issues on the dashboard of the cloud platform by the authorities.

BACKGROUND OF THE INVENTION

Water has always been considered as a physically scarce resource around the world. In fact, the existing current water management systems are facing substantial difficulties, due to the depletion of resources, complexity of regulation and increasing demand of water in society.

A water meter is a device/apparatus that measures the quantity of water passing through a particular point, for example, for billing purposes and resource management. For instance, water meters measure the amount of water that enters a premise, or a part of it over a defined period of time, for example, quarterly. These meters function according to two different principles, namely rate of flow or volumetric, etc.

In most countries, water/fluid meters are used at each residential and commercial building in a public water supply system. These conventional water/fluid meters typically require human intervention to collect data regarding water usage. For example, in the most basic meters, a meter reader will have to visit the premises, inspect the meter, and determine therefrom usage based on the difference between meter readings. This is an immensely inefficient process and readings are sparse, e.g., annually or quarterly. Water meters with the capability of remotely transmitting data have been proposed, but water meters do not have power supplies or have limited power(batter), and/or have limited communications capability and therefore still require a meter reader to at least drive by the meter to collect the data. As a result, meter reading occurs relatively infrequently due to such constraints.

"Smart" water meters have also been proposed, but those too are limited. For example, U.S. Pat. No. 11,047,115B2 discusses a water meter system and method that may provide inline flow monitoring and leak detection that may track real-time water usage. The water meter system and method may utilize one or more dual pressure sensors and/or ultrasonic sensors to detect leaks quickly and automatically turn off a valve. A spool may be utilized that may provide the dual pressure sensors on opposite sides of a ball valve to separate upstream and downstream pressure zones when the valve is closed.

KR20190053433A relates to a smart water metering system and a method thereof and, more specifically, to a smart water metering system and a method thereof which can purportedly secure reliability, convenience, and economic efficiency of water meter reading. The smart water metering system comprises: a water meter installed on a customer; an internet-of-things (IoT) terminal digitally connected to the water meter; a relay which is connected to the internet-of-things terminal via a LoRa communication network (LoRaWAN), and collects meter reading data for water usage of the water meter transmitted from the internet-of-things terminal; an internet-of-things platform which is connected to the relay via an internet communication network, and receives the meter reading data transmitted from the internet-of-things terminal via the relay; a control server which is connected to the internet-of-things platform via a virtual private network (VPN), and extracts and stores the meter reading data received in the internet-of-things platform; and a charge management server which is connected to the control server, and receive the meter reading data from the control server to calculate a water charge of the water meter.

Several attempts have been made to develop improved water management systems, however the drawback is that such systems are unable to solve real time issues of water theft, leakages, and quality across water networks, and are generally unreliable. Moreover, these systems are often not properly or effectively used, and not widely adopted because of the limitations thereof.

Due to the aforementioned drawbacks, there is a need to develop an intelligent water network management system that is versatile for commercial use that can intelligently monitor and/or control water parameters and identify and solve real times issues of pipe cracks, water theft, leakages, pressure, quality and related damages across water networks through, for example, the Edge IoT Gateway (hardware and software platform).

OBJECT OF THE INVENTION

The prime object of at least one embodiment of the invention(s) disclosed herein is to overcome one or more of the limitations of prior systems.

Another object of at least one embodiment is to develop a water management system, wherein the gateway aggregates and processes the real time data of sensors/water meters and transmits it to the cloud platform.

Yet another object of at least one embodiment is to develop an intelligent water management system that offers the following advantages; enlisting the customer in their own water conservation management, assisting customers create their own table/charts to analyze the water consumption, providing real time visibility into water leak, water consumption pattern etc., and/or provide immediate feedback on the effectiveness of water conservation investment.

SUMMARY OF THE INVENTION

The present application is directed towards an intelligent water management system wherein a local gateway is connected wired or wirelessly to water meters, water quality sensors, reservoirs sensors and actuators for aggregating and transferring the real time data or information of sensors/meters at a predefined frequency to a cloud platform. The cloud-based platform receives information from the gateway(s), analyzes this information, predicts and reports water leakages and thefts (real time events) to the authorities, which may further investigate the problems from the dashboard of the cloud platform, irrespective of the preset frequency and time period, etc.

In an embodiment of the present invention, the intelligent water management system is provided that, includes Edge IoT gateway connected to a cloud software/platform; components in water distribution network including water meters, water quality sensors, reservoir sensors and actuators from domestic, commercial and industrial areas connected wired or wirelessly to a local gateway; where the local gateway collects, processes, aggregates and transfers the real time data or information of sensors/meters at a predefined frequency and pushes it to a cloud platform, the local gateway is configured to determine and report the occurrence of a real time event (water leakage/theft/water quality issues/water running out, etc.) intelligently through algorithmic and/or AI models on a computing device to an end user; a data storage unit that stores the gateway reading data and a Network Router.

In another embodiment, a method for collecting, processing, aggregating and transferring real time data via the gateway is provided that includes the steps of; connecting a local gateway to water meters, water quality sensors and actuators in a water distribution network either wired or wirelessly; collecting, processing and aggregating real time information of sensors/meters; transmitting real time data or information to a cloud platform/server; and reporting the occurrence of a real time events and displaying the analyzed event information in various formats to the end user on a computing device.

In another embodiment, an intelligent smart water network management system, is provided that includes a local gateway communicatively connected to a cloud platform; a plurality of water quality sensors communicatively connected to the local gateway and configured to capture water quality data, comprising at least one of pressure and flow, and communicate the water quality data to the local gateway in real time; wherein the local gateway is configured to collect, process, aggregate, and push the real time data at a predefined frequency to a cloud based platform; a data storage unit that stores decoded gateway reading data; and a computing device associated with the cloud platform, wherein said device through the local gateway allows end users to view the occurrence of a real time event comprising at least one of water leakage, theft, water quality issues, and water running out, intelligently through algorithmic or AI models.

In one embodiment, the cloud-based platform receives information from a plurality of local gateways, analyzes the information received, identifies an occurrence of real time events in a water distribution network; alerts the relevant authorities for investigation of water such events at a specific location from a dashboard of the cloud platform.

In one embodiment, the computing device may include a computer, a laptop, a smart mobile, a tablet, a personal digital assistant amongst others.

In one embodiment, the display of the real time data or information includes at least one of digits, analog display, graphics, pictures, charts and other characters to exhibit the water condition to a registered user.

In one embodiment, a network router facilitates communicative connection between elements of said system and facilitates transmission of captured real time data of water parameters to be stored on said gateway.

In one embodiment, the system is integrated with any type of analog and/or digital water meter.

In one embodiment, the system is communicatively enabled using a wireless communication technology selected from the group consisting of Bluetooth, Wi-Fi, Zigbee and Lora.

In one embodiment, the system includes a tank and wherein the system generates an automated alert on a dashboard, if a water level in the tank exceeds a predefined water level range, regardless of the predefined frequency.

In one embodiment, the system generates an automated alert on the dashboard, even if the water level is within the predefined range regardless of the preset frequency.

In another embodiment, a method for collecting, processing, aggregating, and transferring data via a local gateway, is provided that includes the steps of: connecting components in a water distribution network including at least one water meter and a plurality of water quality sensors either wired or wirelessly connected to the local gateway; collecting, processing, and aggregating real time information from the at least one water meter and plurality of water quality sensors; transmitting the real time information to a cloud platform; analyzing the information received from a plurality of local gateways by the cloud based platform; predicting and reporting an occurrence of real time events including at least one of water theft and water leakages in a water network; and alerting relevant authorities regarding the water theft/leakage issues for investigation regarding problems from a dashboard of the cloud platform by the authorities In one embodiment, the method includes displaying a report on the cloud dashboard/platform regarding the water alerts, leakages, and running out of water.

While the methods and system have been described and shown with particular reference to the preferred embodiment, it will be apparent that variations might be possible that would fall within the scope of the present invention.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed. Further, the advantages and features of the present disclosure will better understood with reference to the following detailed description and claims taken in conjunction with the accompanying drawing, wherein like elements are identified with like symbols, and in which:

FIG. 1 illustrates the architectural design of the smart water meter network.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of," the like.

As used herein, the singular forms "a," "an," and "the" designate both the singular and the plural, unless expressly stated to designate the singular only.

Further, the use of terms "first", "second", and "third", and the like, herein do not denote any order, quantity, or importance, but rather are used to distinguish one element from another.

The term "authentication" refers to the technology that ensures that, a message, data, control command signal or information that is downloaded or transferred from a one person or device to another declared or intended person or device.

The term "encryption" refers to a privacy technology that prevents anyone but the intended recipient(s) from downloading, reviewing or reading confidential information, signals and/or data.

The present application provides an improved combination of system and method for tracking and determining real-time data of water parameters to resolve issues of water leakage, water quality, and water shortage, and/or water theft issues across water networks. Preferably, the intelligent water network management system brings together data of several parameters including water pressure, water quality, and/or water level in a water network and tracks real-time data of such parameters and resolves issues of water leakage, water quality, and water shortage, amongst others.

The cloud-based platform receives information from the gateway(s), analyzes this information, predicts, and reports water leakages and thefts (real time events) to the authorities, which may further investigate the problems from the dashboard of the cloud platform, irrespective of the preset frequency and time period.

Referring to FIG. 1 is an architectural flow diagram, depicting the water distribution network with a smart water management system 101. Generally, water is distributed by a utility company to the premises via a water main. Water meters 108 (with or without actuators 105) are located between the water main and the premises plumbing. In some instances, there are no water meters, such as when the municipality does not charge fees based on usage or when the water originates from a well, for example. In certain embodiments, the water system may include a reservoir tank 106, which may pressurize the incoming water, before distributing the water to the premises, as needed.

Preferably, the system includes one or a plurality of water meter/water quality sensors 102 and/or actuators, as shown. In at least one embodiment, the system includes an Edge IoT gateway 103, using one or more wireless communication technologies, a cloud platform 104, and a data storage unit (local and/or remote). The Edge IoT gateway 103 is preferably communicatively connected to a cloud software/platform 103 and the water meter/water quality sensors 102 and actuators 105 are connected via wired or wirelessly (LoRa protocol/Zigbee 105) to a single local gateway 103 in a water distribution network; a local or remote data storage unit that stores the decoded gateway reading data, a Network Router, and a computing device and a dashboard 107. The water quality sensors may be pressure sensors, flow sensors, and the like.

The water meter/water quality sensors 102 and actuators 105 control and monitor the water networks and convert analog data captured by the sensors to digital format.

The local gateway 103 receives real time data from the sensors/actuators via wired or the IOT wireless communication technologies (Bluetooth, WiFi, Zigbee, LoRa, etc) and thereafter collects, processes, aggregates and transfers the generated real time data of the sensors/meters to a cloud platform or server (e.g., computing device 107).

The smart water management system 101 may be a wireless device which is connected to the gateway for transmitting the water metrics.

The system preferably combines and measures parameters related to the water flow through the Edge IOT gateway 103.

The Edge gateway 103 is preferably configured to combine the real time analog data of water parameters (including water pressure, water quality, and/or water level) and convert the analog data to digital data, process it via IoT wireless communication and thereafter transmit this data to the cloud server 107 or cloud through the network 104.

The Edge Gateway 103 preferably has built-in capability to store and process the analog data and convert this data into digital data. The Edge Gateway 103 includes (local) storage and processing hardware and software. Specifically, the gateway comprises one or more processors.

The wireless communication or wired communication means can electronically communicate with a local router/server which uses the Internet and cloud platform to allow remote access of the water usage data.

Wireless communication means preferably utilizes encryption, authentic, integrity techniques to provide a secure transfer of the water use to a cell phone, smart phone or similar apparatus.

The system 101 specifically consists of three types of sensors 102, namely water quality sensors, pressure sensors and water level sensors.

The data storage unit stores the decoded Edge IOT gateway 103 reading data.

A network router may be configured to facilitate communicative connection between the elements of the system and to facilitate transmission of captured data of subject parameters to be stored on Edge Gateway and, then, on the Cloud Platform.

The cloud platform 104/107 here may be referred to as a cloud or a physical server located in a remote location. The cloud platform comprises a plurality of computing devices that are distributed over a plurality of geographical areas. The cloud platform is configured to function as a server and database that stores user information, etc.

The computing device may access the cloud through the water network. It may include a computer, a laptop, a smart mobile, a tablet, a personal digital assistant and alike without limiting the scope of the present invention.

The display of the water condition data can be in various formats using digits, analog display, graphics, pictures, charts and/or other characters to exhibit the water condition to a registered user.

The real time data of the system is preferably able to identify water leakage i.e., Non-Revenue Water. The system is preferably able to define a schedule wherein through AI the demand of water and revenue can be predicted. That is, a machine learning model may be trained to predict certain undesirable conditions in the water network, such as leaks.

The method for collecting, processing, aggregating, and transferring analog to digital data via the gateway, includes one or more of the steps as narrated in the below paragraphs.

Step 1 connecting a local gateway to water meter/water quality sensors and actuators in a water distribution network either wired or wirelessly through the IOT wireless communication (LoRa, Zigbee etc). The connection is preferably established initially, and the connection persists continually for real-time system monitoring.

Step 2 collecting, processing, aggregating, and transferring the generated real time data information or water metrics by the local gateway to a cloud platform. That is, the sensors capture data in an analog form and provide that data to the local gateway. This may be accomplished in a variety of ways. Preferably, the sensor data is digitized at the sensor and communicated to the gateway in a usable digital form. The gateway may then communicate the data to the cloud platform. The data may be processed at the gateway and/or the cloud platform to determine the occurrence of an undesirable event in real time. For example, the gateway may process data in real time and continually, and report events upon occurrence. Alternatively, the gateway may communicate the data to the gateway, which will then report the occurrence of events.

Step 3 reporting the occurrence of a real time event, i.e., water theft/leakage is determined through AI training model or algorithmic conditions at a predefined frequency and time period.

Step 4 displaying the analyzed water metrics, data storage and reporting in a plurality of graphical formats to the end user on a dashboard. That is, the system may generate a graphical interface screen which provides metrics regarding the information collected.

The smart water meter may be utilized in various industries including, but not limited to, corporate locations, individual residential homes; municipalities and utilities; multi-tenant, apartment, and condominium structures.

Although the present disclosure has been described in terms of certain preferred embodiments and illustrations thereof, other embodiments and modifications to preferred embodiments may be possible that are within the principles and spirit of the invention. The above descriptions and FIGURES are therefore to be regarded as illustrative and not restrictive. Thus, the scope of the present disclosure is defined by the appended claims and includes both combinations and sub combinations of the various features described herein above as well as variations and modifications thereof, which would occur to persons skilled in the art upon reading the foregoing description.

The invention claimed is:

1. An intelligent smart water network management system, comprising;
    a local gateway communicatively connected to a cloud based platform;
    a plurality of water quality sensors communicatively connected to the local gateway and configured to capture analog water quality data, comprising at least one of pressure and flow, convert the analog water quality data to digital format, and communicate the water quality data in digital form to the local gateway in real time, wherein the plurality of water quality sensors are installed at a premises downstream from a water main, including a first water quality sensor installed at a pressurized tank, and a second water quality sensor installed between the water main and the tank,
    at least one actuator communicatively connected to the local gateway and configured to control flow of water between the water main and the pressurized tank;
    wherein the local gateway is configured to collect, process, aggregate, and push real time water quality data at a predefined frequency to the cloud based platform;
    a data storage unit that stores the converted analog water quality data at the local gateway; and
    a computing device associated with the cloud based platform, wherein said device through the local gateway allows end users to view an occurrence of a real time event comprising at least one of water leakage, theft, water quality issues, and water running out, intelligently through algorithmic or AI models, wherein the algorithmic or AI models are trained to define a schedule of demand of water at the premises and wherein the occurrence of the real time event is determined based at least in part on predicted demand.

2. The system of claim 1, wherein the cloud based platform receives information from a plurality of local gateways, analyzes the information received, identifies an occurrence of real time events in a water distribution network;
    alerts relevant authorities for investigation of water such events at a specific location from a dashboard of the cloud platform.

3. The system of claim 1, wherein said computing device may include a computer, a laptop, a smart mobile, a tablet, a personal digital assistant amongst others.

4. The system of claim 1, wherein display of the real time water quality data or information includes at least one of digits, analog display, graphics, pictures, charts and other characters to exhibit a water condition to a registered user.

5. The system of claim 1, wherein a network router facilitates communicative connection between elements of said system and facilitates transmission of captured real time data of water parameters to be stored on said gateway.

6. The system of claim 1, wherein said system is integrated with any type of analog and/or digital water meter.

7. The system of claim 1, wherein the system is communicatively enabled using a wireless communication technology selected from a group consisting of Bluetooth, Wi-Fi, Zigbee and Lora.

8. The system of claim 1, wherein the system generates an automated alert on a dashboard, if a water level in the tank exceeds a predefined water level range, regardless of the predefined frequency.

9. The system of claim 8, wherein said system generates an automated alert on the dashboard, even if the water level is within a predefined range regardless of the predefined frequency.

10. A method for collecting, processing, aggregating, and transferring data via a local gateway, comprising steps of:
    connecting components in a water distribution network including at least one water meter and a plurality of water quality sensors either wired or wirelessly connected to the local gateway, wherein the plurality of water quality sensors are configured to capture analog water quality data, comprising at least one of pressure and flow, convert the analog water quality data to digital format, and communicate the water quality data in digital form to the local gateway in real time, wherein the plurality of water quality sensors are installed at a premises downstream from a water main, including a first water quality sensor installed at a pressurized tank, and a second water quality sensor installed between the water main and the tank;
    collecting, processing, and aggregating real time information from the at least one water meter and plurality of water quality sensors; transmitting the real time information to a cloud based platform;
    analyzing the information received from a plurality of local gateways by the cloud based platform;
    predicting and reporting an occurrence of real time event including at least one of water theft and water leakages in a water network, wherein algorithmic or AI models are trained to define a schedule of demand of water at the premises and wherein the occurrence of the real time event is determined based at least in part on predicted demand; and alerting relevant authorities regarding the at least one water theft and the water leakages for investigation regarding problems from a dashboard of the cloud platform by the authorities.

11. The method of claim 10, comprising displaying a report on the dashboard of the cloud platform regarding the at least one water theft and the water leakages, and running out of water.

\* \* \* \* \*